(12) United States Patent
Yaguma et al.

(10) Patent No.: US 12,309,486 B2
(45) Date of Patent: May 20, 2025

(54) TRANSMISSION ELEMENT IMAGING DEVICE AND TRANSMISSION ELEMENT IMAGING METHOD

(71) Applicant: ROHM Co., LTD., Kyoto (JP)

(72) Inventors: Hiroshi Yaguma, Kyoto (JP); Masahiro Yasuda, Kyoto (JP)

(73) Assignee: ROHM Co., LTD., Kyoto (JP)

( * ) Notice: Subject to any disclaimer, the term of this patent is extended or adjusted under 35 U.S.C. 154(b) by 231 days.

(21) Appl. No.: 17/817,047

(22) Filed: Aug. 3, 2022

(65) Prior Publication Data
US 2023/0042935 A1 Feb. 9, 2023

(30) Foreign Application Priority Data

Aug. 4, 2021 (JP) ................. 2021-127979

(51) Int. Cl.
*H04N 23/66* (2023.01)
*H04N 23/695* (2023.01)

(52) U.S. Cl.
CPC ........... *H04N 23/66* (2023.01); *H04N 23/695* (2023.01)

(58) Field of Classification Search
CPC ...... H04N 23/66; H04N 23/695; H04N 23/80; H04N 23/61; H04N 23/611; B25J 5/007; B25J 9/0003; B25J 9/162; B25J 9/1664; B25J 9/1684; B25J 9/1689; B25J 19/021; B25J 19/023

See application file for complete search history.

(56) References Cited

U.S. PATENT DOCUMENTS

| | | | |
|---|---|---|---|
| 11,711,616 B2 * | 7/2023 | Reed .................. | A63B 24/0021 348/375 |
| 2018/0035056 A1 * | 2/2018 | Jindal .................... | G03B 15/00 |
| 2020/0084373 A1 * | 3/2020 | Kaku ..................... | H04N 23/64 |
| 2020/0338742 A1 * | 10/2020 | Yamaguchi .......... | G05D 1/0246 |
| 2021/0216786 A1 * | 7/2021 | Machida ................ | H04N 23/62 |
| 2022/0111522 A1 * | 4/2022 | Ko ......................... | B25J 9/1666 |
| 2022/0211010 A1 * | 7/2022 | Seo ......................... | B60L 53/65 |

FOREIGN PATENT DOCUMENTS

JP    2020181485    11/2020

* cited by examiner

*Primary Examiner* — Abby Y Lin
*Assistant Examiner* — Esvinder Singh
(74) *Attorney, Agent, or Firm* — CHIP LAW GROUP

(57) ABSTRACT

Disclosed is a transmission element imaging device capturing an image of a transmission element that transmits a signal, including a reception element group including a plurality of reception elements each receiving the signal transmitted from the transmission element, a direction detection unit detecting a direction of the transmission element on a basis of the signal received by each of the plurality of reception elements, a camera whose relative positional relation with the reception element group is determined and which captures an image in the direction of the transmission element, and an image processing unit generating an image in which a marker indicating the direction of the transmission element is added to the image captured by the camera.

9 Claims, 9 Drawing Sheets

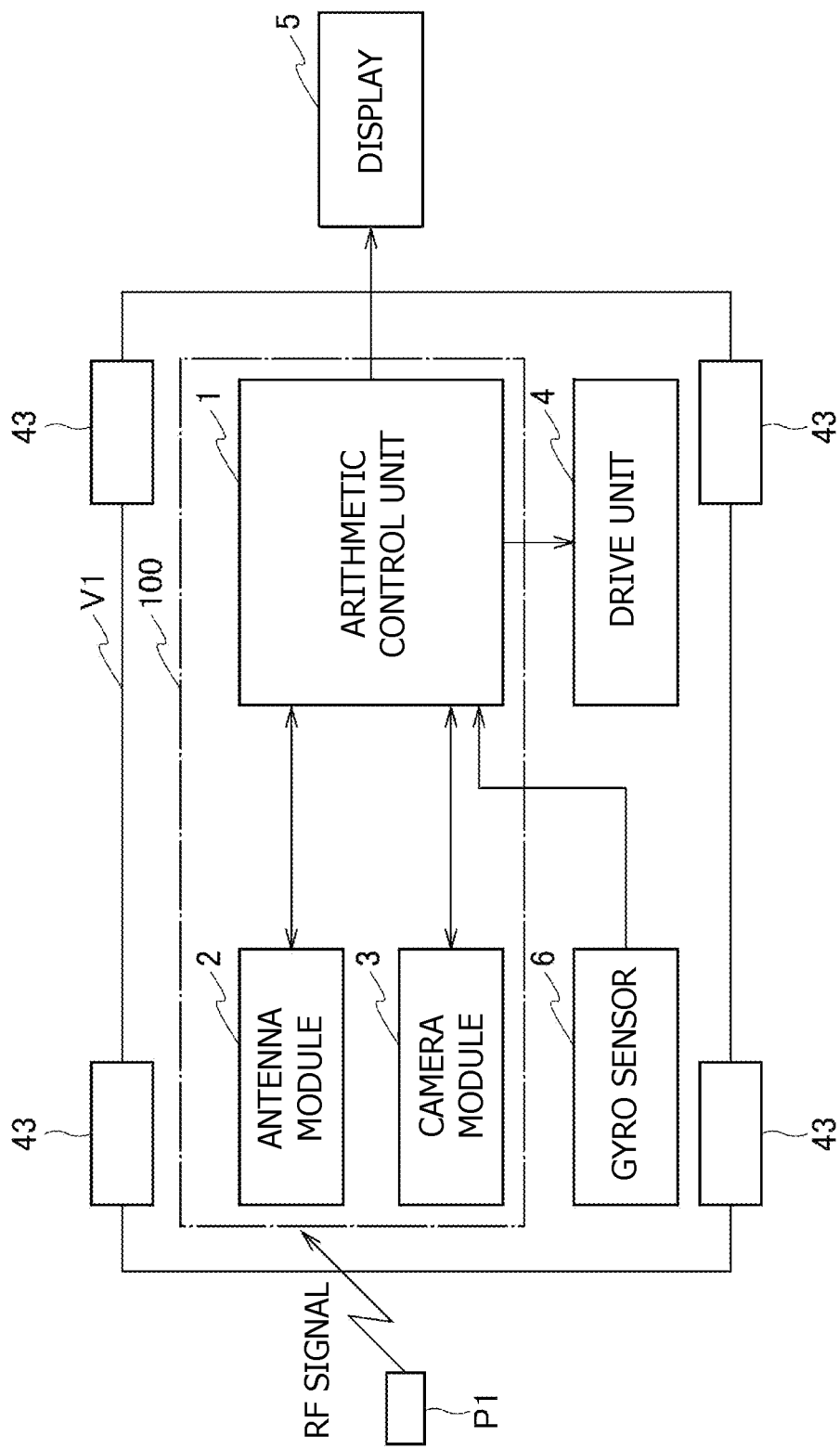
F I G . 1

TRANSMISSION ELEMENT IMAGING DEVICE AND TRANSMISSION ELEMENT IMAGING METHOD

CROSS REFERENCE TO RELATED APPLICATIONS

This application claims priority benefit of Japanese Patent Application No. JP 2021-127979 filed in the Japan Patent Office on Aug. 4, 2021. Each of the above-referenced applications is hereby incorporated herein by reference in its entirety.

BACKGROUND

The present disclosure relates to a transmission element imaging device and a transmission element imaging method.

For example, an unmanned transfer robot system disclosed in Japanese Patent Laid-Open No. 2020-181485 (hereinafter referred to as Patent Document 1) includes an unmanned transfer vehicle capable of traveling on a road surface between a plurality of work stations, a robot that is mounted on the unmanned transfer vehicle, and a sensor that is mounted on the robot and that detects a condition of the road surface.

The unmanned transfer robot system disclosed in Patent Document 1 also includes a control unit that controls the robot and the unmanned transfer vehicle and the control unit controls the unmanned transfer vehicle on the basis of the condition of the road surface acquired by the sensor.

However, Patent Document 1 does not disclose capturing an image of a target object that is present in the surroundings of the unmanned transfer vehicle. Therefore, there has been an issue that an operator is unable to recognize the state of the target object from an image.

In view of the foregoing, it is desirable to provide a transmission element imaging device and a transmission element imaging method that can capture an image of a target object that is present at a freely selected location.

SUMMARY

A transmission element imaging device according to an example of the present disclosure captures an image of a transmission element that transmits a signal, and the transmission element imaging device includes a reception element group including a plurality of reception elements each receiving the signal transmitted from the transmission element, a direction detection unit detecting a direction of the transmission element on the basis of the signal received by each of the plurality of reception elements, a camera whose relative positional relation with the reception element group is determined and which captures an image in the direction of the transmission element, and an image processing unit generating an image in which a marker indicating the direction of the transmission element is added to the image captured by the camera.

A transmission element imaging method according to an example of the present disclosure captures an image of a transmission element that transmits a signal, and the transmission element imaging method includes receiving the signal transmitted from the transmission element by each of a plurality of reception elements, detecting a direction of the transmission element on the basis of the signal received by each of the plurality of reception elements, capturing an image in the direction of the transmission element by a camera whose position relative to the plurality of reception elements is determined, and generating and displaying an image in which a marker indicating the direction of the transmission element is added to the captured image.

According to an embodiment of the present disclosure, it is possible to capture an image of a target object that is present at a freely selected location.

BRIEF DESCRIPTION OF THE DRAWINGS

FIG. 1 is a block diagram illustrating configurations of a transmission element imaging device according to an embodiment of the present disclosure and its peripheral devices;

DETAILED DESCRIPTION OF THE PREFERRED EMBODIMENTS

Figure 2:
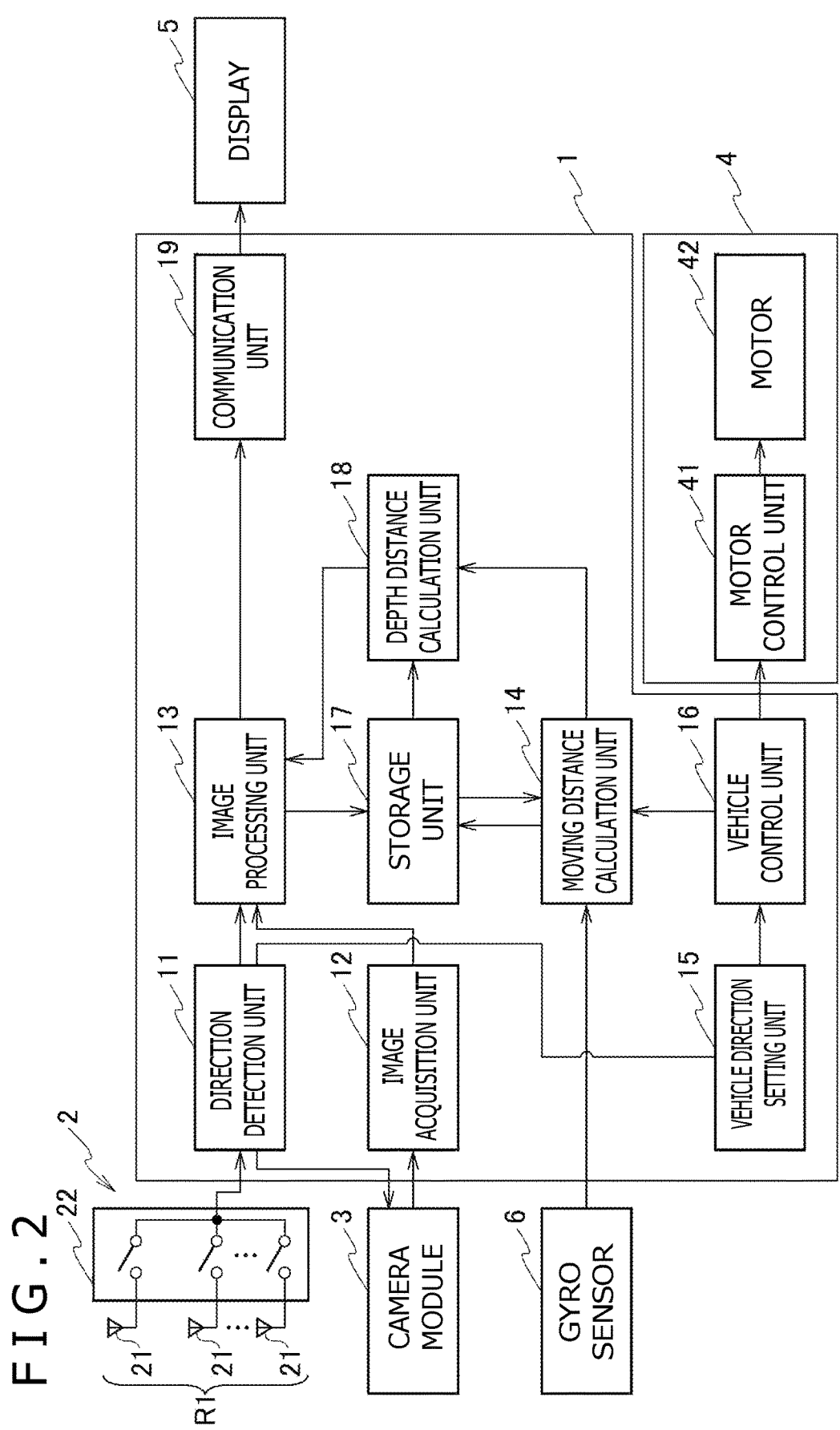
FIG. 2 is a block diagram illustrating the details of each constituent component illustrated in FIG. 1.

Hereinafter, an example of a transmission element imaging device according to the present embodiment will be described in detail with reference to the drawings. The embodiments described below are intended to describe comprehensive or specific examples. The numerical values, shapes, materials, constituent components, installation positions and connection forms of constituent components, steps, the sequence of steps, and the like described in the following embodiments are merely examples and are not intended to limit the present disclosure. Further, among constituent components in the following embodiments, those that are not described in any of the independent claims that indicate the broadest concepts are described as optional constituent components. Furthermore, the dimensional ratios in the drawings are exaggerated for convenience of description and may be different from actual ratios.

In the following first and second embodiments, identical constituent components may be included. The identical constituent components will be denoted by the same reference signs, and duplicate description will be omitted.

Explanation of First Embodiment

FIG. 1 is a block diagram illustrating configurations of a vehicle V1 in which a transmission element imaging device 100 according to an embodiment of the present disclosure is mounted, and its peripheral devices. FIG. 2 is a block diagram illustrating the details of each constituent component illustrated in FIG. 1.

The transmission element imaging device 100 uses an antenna module 2, which is mounted in the vehicle V1 (movable object) capable of traveling autonomously, to receive a radio frequency (RF) signal transmitted from a transmission element P1, such as a beacon disposed at a predetermined location or on a moving target object, and calculates the direction of the transmission element P1 based on the received RF signal. The transmission element imaging device 100 captures an image of the transmission element P1 by directing an imaging axis, which is the center of the imaging direction of a camera mounted in a camera module 3, toward the calculated direction of the transmission element P1.

For example, the transmission element P1 may be attached to a collar of a pet. In this case, even when a pet such as a dog or a cat left in a house moves inside the house, the vehicle V1 can travel autonomously and capture an image of the pet by directing the imaging axis, which is the imaging direction of the camera, toward the direction of the pet. Then, the vehicle V1 transmits the image of the pet wirelessly to the user, so that the user can monitor how the pet is doing from a remote location. Although an RF signal is used as an example of a signal transmitted from the transmission element P1 in the present embodiment, a radio wave, an electromagnetic wave, or a sound wave other than the RF signal can also be used.

The details of the present embodiment are described below. As illustrated in FIG. 1, the transmission element imaging device 100, a gyro sensor 6, and a drive unit 4 are mounted in the vehicle V1.

The drive unit 4 drives and controls four tires 43 mounted on the vehicle V1 to drive the vehicle V1. The vehicle V1 is capable of traveling autonomously by the drive control by the drive unit 4.

The gyro sensor 6 detects the angular velocity and acceleration generated in the vehicle V1 and detects the moving direction and the moving distance of the vehicle V1. Other than the gyro sensor 6, for example, an acceleration sensor, a speed sensor, or other sensors can be used as a sensor to detect the moving direction and moving distance of the vehicle V1.

The transmission element imaging device 100 includes an arithmetic control unit 1, the antenna module 2, and the camera module 3. The transmission element imaging device 100 can move to a freely selected position by causing the vehicle V1 to travel autonomously.

As illustrated in FIG. 2, the antenna module 2 includes a reception element group R1 and an RF switch 22. The reception element group R1 includes a plurality of antennas 21 (reception elements). The RF switch 22 switches on and off of each antenna 21. For example, an array antenna can be used as the plurality of antennas 21.

Each of the plurality of antennas 21 receives an RF signal transmitted from the transmission element P1 (see FIG. 1) such as a beacon installed at a freely selected position.

The RF switch 22 sequentially switches the RF signal received by each antenna 21 and outputs the switched one to the arithmetic control unit 1. As described later, the arithmetic control unit 1 calculates the direction of the transmission element P1, which is the transmission source of the RF signal, based on the RF signal received by each antenna 21.

Figure 3:
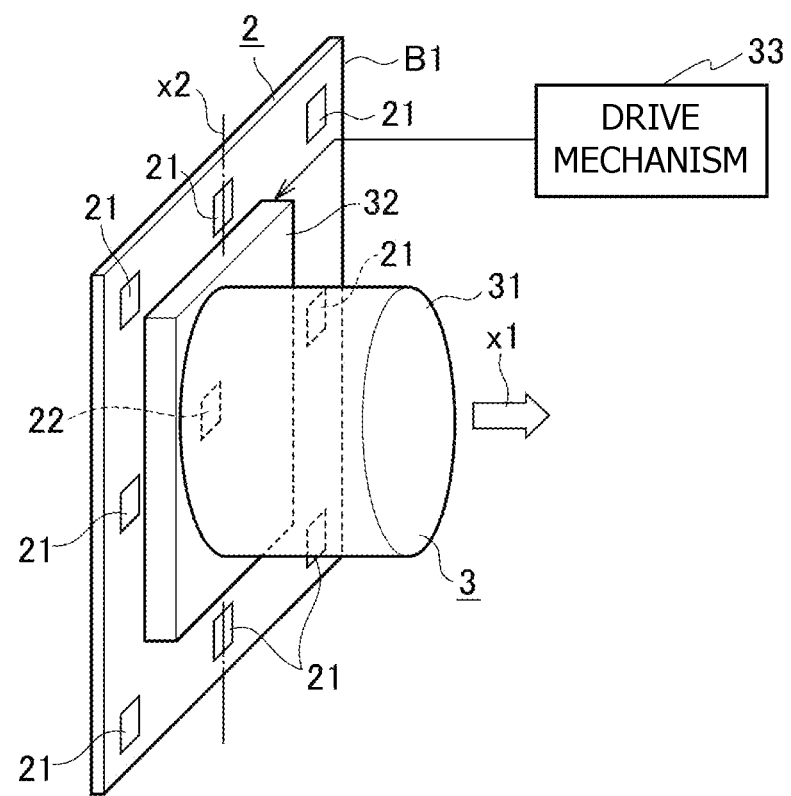
FIG. 3 is a perspective view schematically illustrating configurations of an antenna module and a camera module.

FIG. 3 is a perspective view schematically illustrating configurations of the antenna module 2 and the camera module 3. As illustrated in FIG. 3, the antenna module 2 includes a substrate B1 having a rectangular flat plate shape and includes the plurality of antennas 21 (eight antennas in FIG. 3), which are arranged along the edges of the front surface of the substrate B1. The RF switch 22 is disposed in a central portion of the back surface of the substrate B1. The camera module 3 is disposed on the inner side of the plurality of antennas 21, which are arranged along the edges of the substrate B1.

The camera module 3 includes a camera 31, such as an optical camera or a charge-coupled device (CCD) camera, a fixing base 32, and a drive mechanism 33. The fixing base 32 fixes the camera 31. The drive mechanism 33 changes the direction of an imaging axis x1 of the camera 31. Specifically, the drive mechanism 33 rotates and drives the fixing base 32 around a rotation axis x2, which is set in the vertical direction. By controlling the drive mechanism 33, it is possible to change the orientation of the fixing base 32, thereby changing the direction of the imaging axis x1 of the camera 31, which is mounted on the fixing base 32, when necessary.

The fixing base 32 is disposed in the substantially center of the front surface of the substrate B1. Therefore, the camera 31 is disposed at the center of the substrate B1 on which the plurality of antennas 21 are mounted. That is, the substrate B1 is disposed on the side opposite to the imaging direction of the camera 31, and the relative positional relation between the reception element group R1 including the plurality of antennas 21 and the camera 31 is determined. When the fixing base 32 is caused to rotate about the rotation axis x2 under the control of the drive mechanism 33 described above, the substrate B1 rotates in conjunction with the rotation of the fixing base 32.

Therefore, the direction of the transmission element P1 is calculated based on the RF signal received by each antenna 21, and the imaging axis x1 of the camera 31 is controlled so as to be oriented in the direction of the transmission element P1. In conjunction with this, the normal direction of the substrate B1 is oriented in the direction of the transmission element P1. In other words, the normal direction of the substrate B1 matches the imaging axis x1 of the camera 31. Since the relative positional relationship between the camera 31 and each antenna 21 does not change, when a marker indicating the direction of the transmission element P1 is added to an image captured by the camera 31 as described later, it is not necessary to perform arithmetic such as zero-point correction that corrects the positional relationship between the camera 31 and each antenna 21.

Figure 4:
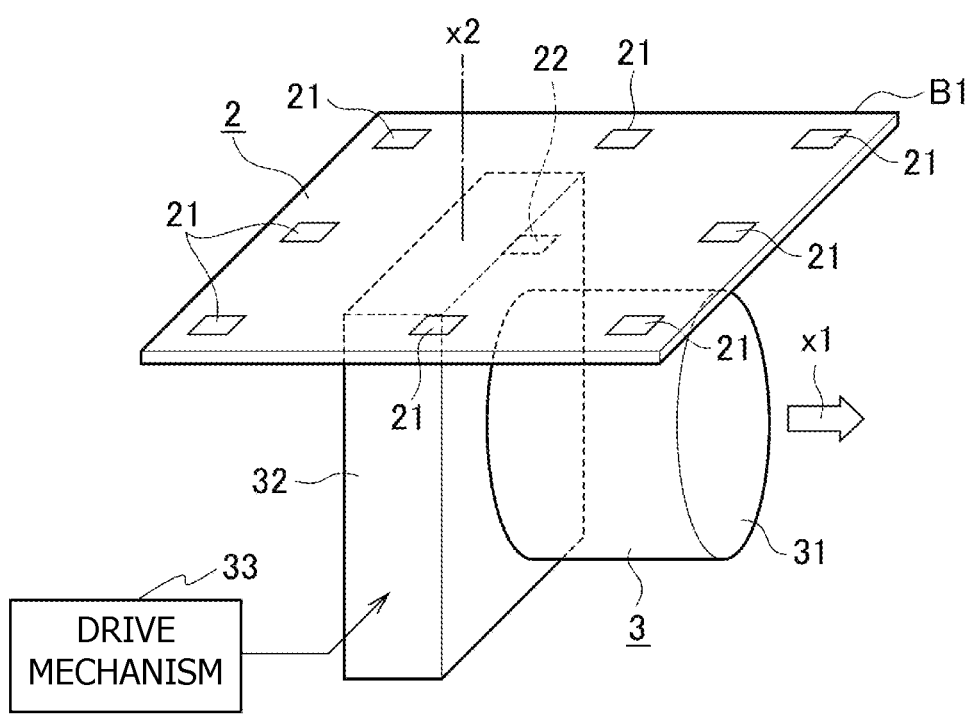
FIG. 4 is a perspective view schematically illustrating another example of the configurations of the antenna module and the camera module.

FIG. 4 is a perspective view schematically illustrating another example of the configurations of the antenna module 2 and the camera module 3. The substrate B1 of the antenna module 2 illustrated in FIG. 4 is disposed in the direction orthogonal to the top surface of the fixing base 32.

As in FIG. 3 described above, the plurality of antennas 21 are arranged along the edges of the front surface of the substrate B1 having a rectangular flat plate shape. The RF switch 22 is disposed in a central portion of the back surface of the substrate B1. Since the fixing base 32 is disposed orthogonally to the substrate B1, the imaging axis x1 of the camera 31 is oriented in the direction parallel to the front surface of the substrate B1.

In the configurations illustrated in FIG. 4, as in FIG. 3, the relative positional relation between the camera 31 and each antenna 21 is determined. Therefore, when the orientation of the camera 31 changes, it is not necessary to perform the arithmetic such as zero-point correction that corrects the positional relation between the camera 31 and each antenna 21.

Referring back to FIG. 2, the arithmetic control unit 1 includes a direction detection unit 11, an image acquisition unit 12, an image processing unit 13, a moving distance calculation unit 14, a vehicle direction setting unit 15, a vehicle control unit 16, a storage unit 17, a depth distance calculation unit 18, and a communication unit 19.

The direction detection unit 11 acquires the RF signal received by each antenna 21. The RF switch 22 sequentially switches the connections with the individual antennas 21, so that the direction detection unit 11 can sequentially acquire the RF signal received by each antenna 21.

The direction detection unit 11 detects the direction of the transmission element P1 based on the phase differences among the RF signals received by the individual antennas 21.

As illustrated in FIGS. 3 and 4, the plurality of antennas 21 included in the antenna module 2 are disposed at different installation positions on the substrate B1. Therefore, the timings at which the individual antennas 21 receive the RF signal transmitted from the transmission element P1 are different from each other. This causes the phase differences among the RF signals received by the individual antennas 21. Based on the phase differences among the RF signals received by the individual antennas 21, the direction detection unit 11 detects the arrival direction of the RF signal, that is, the direction of the transmission element P1.

The direction detection unit 11 outputs the data indicating the direction of the transmission element P1 to the image processing unit 13, the vehicle direction setting unit 15, and the drive mechanism 33 (see FIGS. 3 and 4) mounted in the camera module 3.

Based on the direction of the transmission element P1, the drive mechanism 33 illustrated in FIGS. 3 and 4 changes the orientation of the fixing base 32 such that the imaging axis x1 of the camera 31 is oriented in the direction of the transmission element P1. Therefore, even when the relative positional relationship between the vehicle V1 and the transmission element P1 changes, the imaging axis x1 of the camera 31 can be oriented in the direction of the transmission element P1, following this change.

The image acquisition unit 12 illustrated in FIG. 2 acquires an image captured by the camera 31. The image acquisition unit 12 outputs the acquired image to the image processing unit 13.

Figure 5:
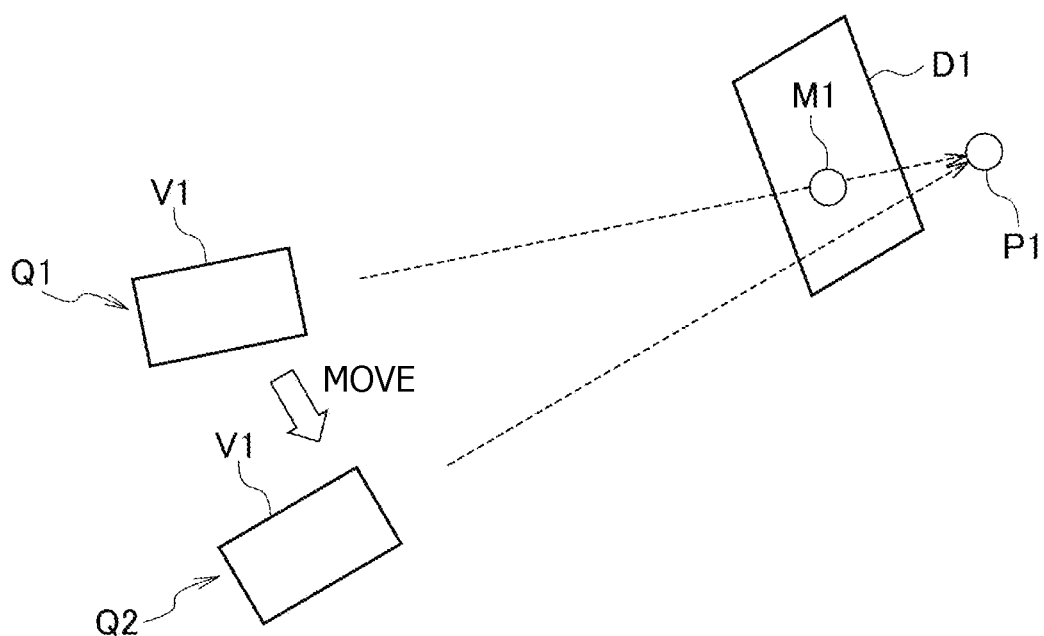
FIG. 5 is a diagram for describing the principle for calculating the depth distance to a transmission element by use of two images.
Figure 8:
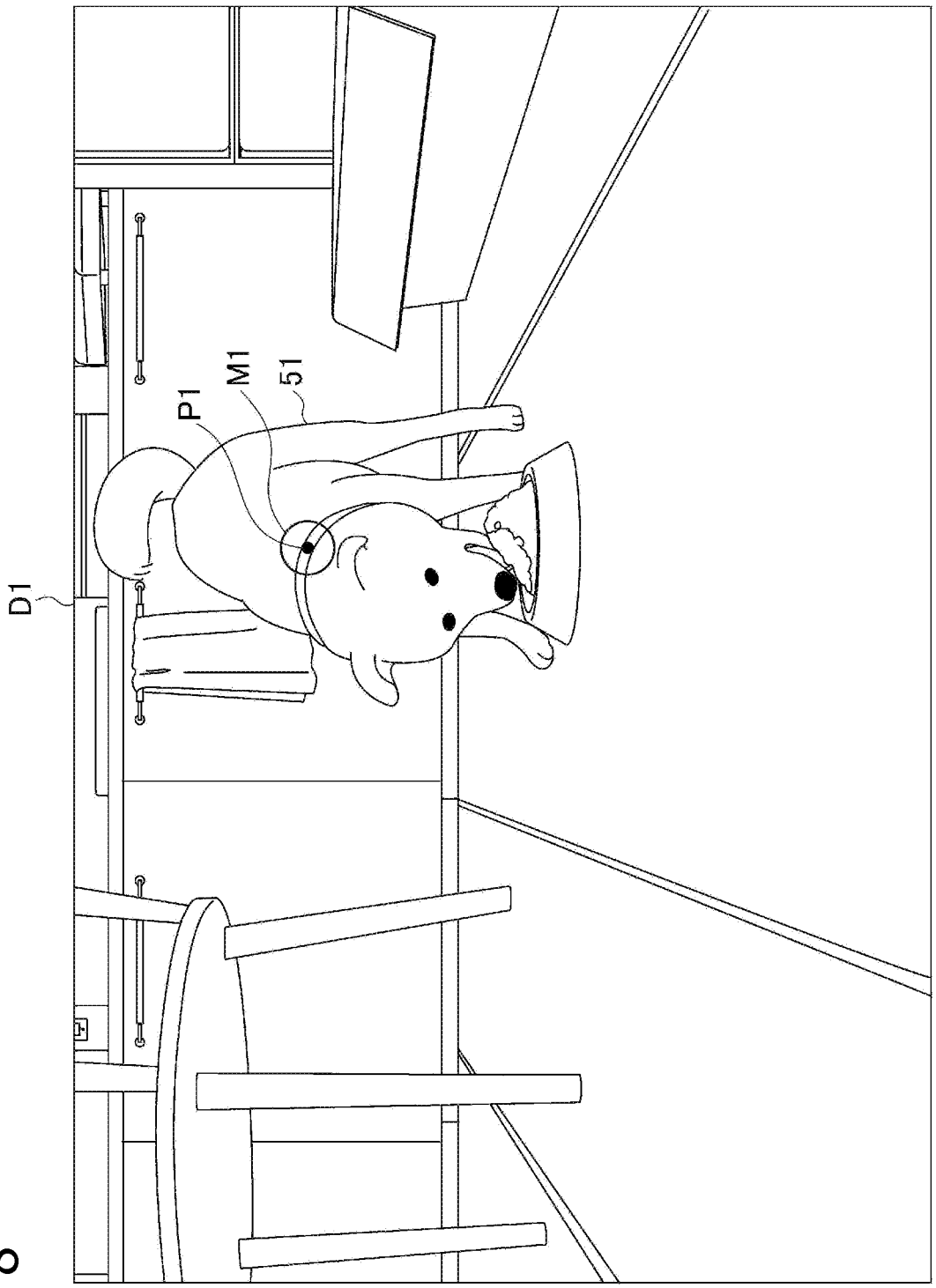
FIG. 8 is a view for describing an example in which a marker is displayed on an image of a pet left indoors.
Figure 9:
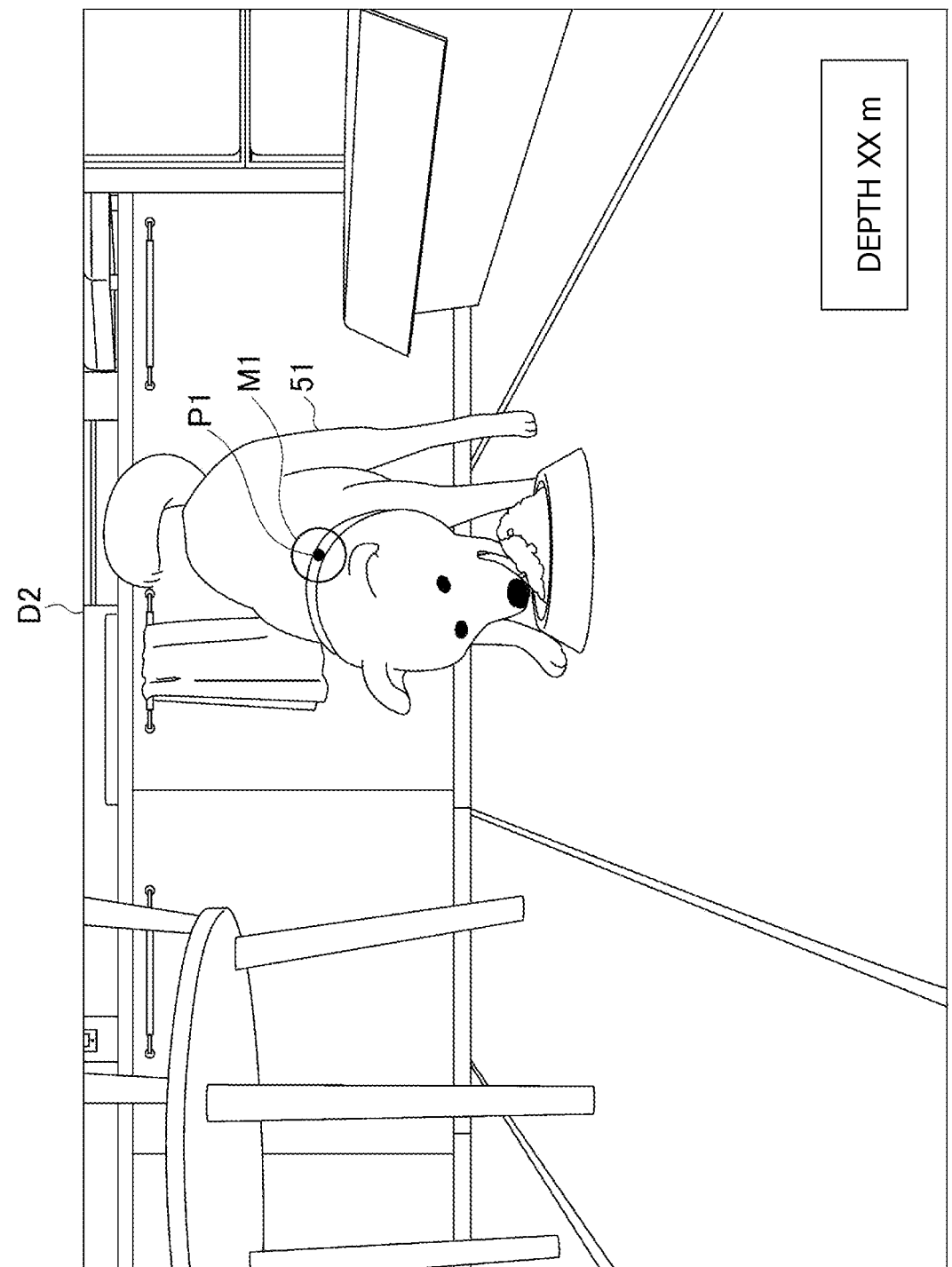
FIG. 9 is a view for describing an example in which the marker and the distance are displayed on an image of the pet left indoors.

The image processing unit 13 adds a marker indicating the position of the transmission element P1 to the image acquired by the image acquisition unit 12 and displays the resultant image. As illustrated in FIGS. 3 and 4, the substrate B1 of the antenna module 2 is fixed to the fixing base 32 of the camera module 3. Therefore, the relative positional relation between the direction of the imaging axis x1 of the camera 31 and the substrate B1 on which each antenna 21 is mounted is fixed. Accordingly, the positional relation between the image captured by the camera 31 and the transmission element P1 can be calculated without performing special arithmetic processing. As a result, as illustrated in FIGS. 5, 8, and 9 described later, an image in which a marker M1 indicating the direction of the transmission element P1 is added to an image D1 or D2 captured by the camera 31 can be displayed.

Furthermore, the image processing unit 13 performs a process of superimposing information such as, for example, "depth xx m" on the image acquired by the image acquisition unit 12 based on the distance (depth distance to be described later) to the transmission element P1 calculated by the depth distance calculation unit 18 and displaying the resultant image. The image processing unit 13 generates an image in which the marker M1 indicating the position of the transmission element P1 and the distance to the transmission element P1 are added to an image that has been captured by the camera 31 and that includes the transmission element P1, and outputs the generated image to the communication unit 19.

The vehicle direction setting unit 15 sets the moving direction of the vehicle V1. For example, to calculate the distance (depth distance) from the camera 31 to the transmission element P1, the camera 31 captures an image of the transmission element P1 at each of two positions, that is, when the camera 31 is located at a first position and when the camera 31 is located at a second position.

Based on the images captured at the first and second positions, the distance to the transmission element P1 can be calculated by use of the principle of distance measurement with a stereo camera, which is a well-known technique. In this case, the vehicle direction setting unit 15 sets the moving direction of the vehicle V1 such that the vehicle V1 moves to the second position, which is a predetermined distance away from the first position.

The vehicle control unit 16 outputs a control signal to the drive unit 4 to cause the vehicle V1 to move in the direction set by the vehicle direction setting unit 15.

The moving distance calculation unit 14 acquires a detection signal of the gyro sensor 6 and calculates the moving direction and the moving distance of the vehicle V1. The moving distance calculation unit 14 stores the calculated moving direction and moving distance in the storage unit 17.

The storage unit 17 stores various data including the image generated by the image processing unit 13 and the moving direction and the moving distance calculated by the moving distance calculation unit 14.

The depth distance calculation unit 18 calculates the distance from the camera 31 to the transmission element P1 based on the images that include the transmission element P1 and that are stored in the storage unit 17. Specifically, the depth distance calculation unit 18 calculates the distance to the transmission element P1 by use of the principle of the distance measurement with a stereo camera, based on the image captured by the camera 31 at the first position before the vehicle V1 moves and the image captured by the camera 31 at the second position after the vehicle V1 has moved a predetermined distance therefrom.

FIG. 5 is a diagram for describing the principle for calculating the distance from the camera 31 mounted in the vehicle V1 to the transmission element P1. As illustrated in FIG. 5, when the vehicle V1 is located at the first position Q1, the camera 31 captures an image of the transmission element P1. Then, the vehicle V1 is caused to move to the second position Q2, and the camera 31 captures an image of the transmission element P1 again. Based on the images captured at the positions Q1 and Q2, the distance from the camera 31 mounted in the vehicle V1 to the transmission element P1 can be calculated.

When the camera 31 mounted in the vehicle V1 is a monocular stereo camera, the depth distance calculation unit 18 can calculate the distance to the transmission element P1 based on an image captured by the monocular stereo camera, regardless of the movement of the vehicle V1. When the monocular stereo camera is used as the camera 31, it is not necessary to cause the vehicle V1 to move to capture multiple images. The distance to the transmission element P1 can be calculated based on an image captured at a freely selected position.

The depth distance calculation unit 18 outputs the distance from the camera 31 to the transmission element P1 calculated by the above-described arithmetic to the image processing unit 13. As described above, the image processing unit 13 generates an image in which the marker M1 indicating the position of the transmission element P1 and the distance to the transmission element P1 are added to the image of the transmission element P1, and outputs the generated image to the communication unit 19.

The communication unit 19 transmits the image generated by the image processing unit 13 to a display 5 mounted in an external device or other devices.

The drive unit 4 includes a motor 42 and a motor control unit 41. The motor 42 drives the four tires 43 mounted on the vehicle V1. The drive unit 4 acquires a drive control signal output from the vehicle control unit 16 and performs control to move the vehicle V1 in the desired direction by rotating and driving each tire 43 illustrated in FIG. 1.

Operation of First Embodiment

Figure 6:
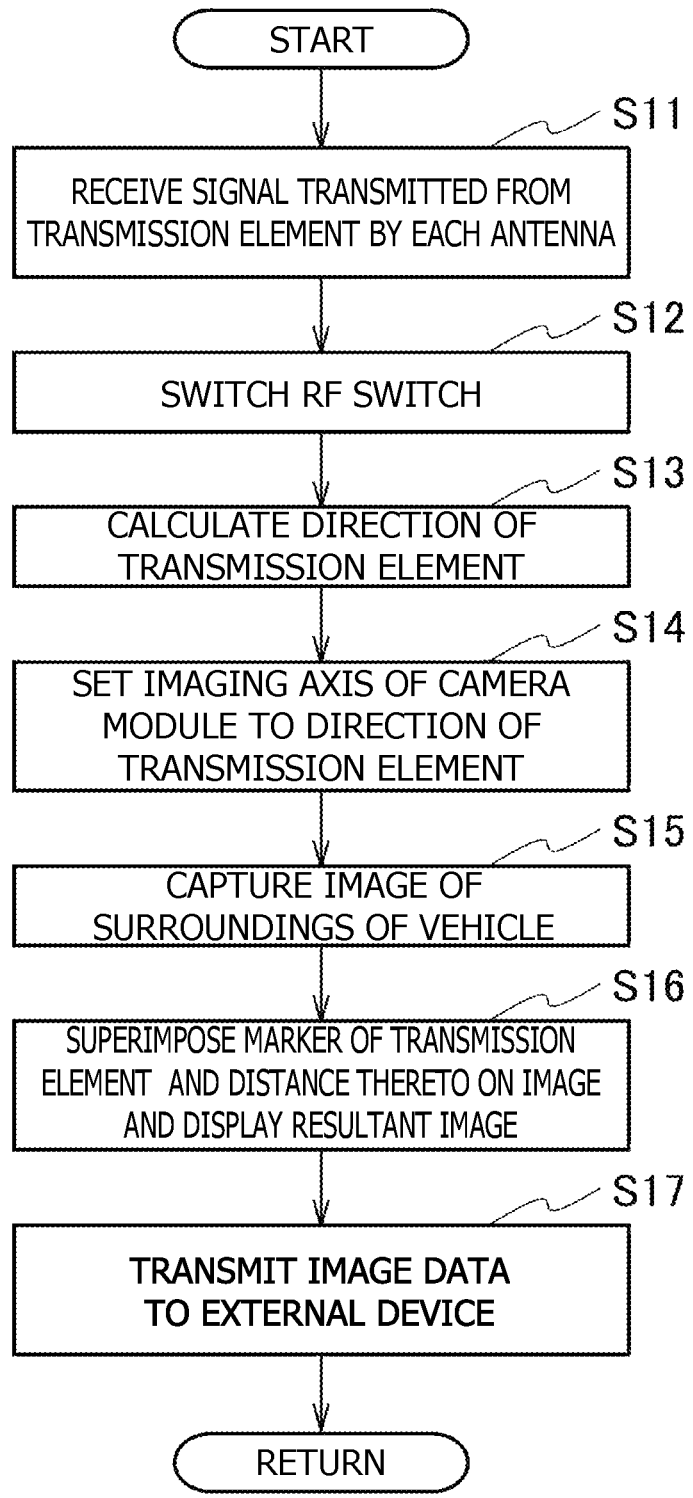
FIG. 6 is a flowchart illustrating the processing procedure of the transmission element imaging device according to a first embodiment of the present disclosure.

Next, an operation of the transmission element imaging device 100 according to the first embodiment will be described with reference to the flowchart illustrated in FIG. 6.

When an RF signal is transmitted from the transmission element P1, each of the antennas 21 mounted in the antenna module 2 receives the RF signal transmitted from the transmission element P1 in step S11.

In step S12, the antenna module 2 switches on and off of the RF switch 22 to sequentially select the output of the RF signal received by each antenna 21 and outputs the selected one to the direction detection unit 11.

In step S13, the direction detection unit 11 calculates the direction of the transmission element P1 based on the phase differences among the received signals received by the individual antennas 21.

In step S14, the drive mechanism 33 of the camera module 3 performs control to drive and rotate the fixing base 32 illustrated in FIG. 3 or 4 around the rotation axis x2 such that the imaging axis x1 of the camera 31 is oriented in the direction of the transmission element P1.

In step S15, the camera 31 captures an image in the direction of the transmission element P1 and outputs the captured image to the image processing unit 13.

In step S16, the image processing unit 13 adds the marker M1 indicating the direction of the transmission element P1 to the image captured by the camera 31. For example, as illustrated in FIG. 8, when the transmission element P1 is attached to a collar of a pet 51, in this example, a dog kept as a pet, the camera 31 captures the image D1 of the surroundings including the pet 51. The image processing unit 13 generates an image in which the marker M1 is added to the captured image D1.

In step S17, the communication unit 19 transmits the image generated by the image processing unit 13 to an external device. The image generated by the image processing unit 13 is displayed on the display 5 mounted in the external device such as a smartphone carried by the user, for example. By viewing the image displayed on the display 5, the user can recognize the image including the transmission element P1, that is, the image of the pet 51, at a remote location, for example.

Effects of First Embodiment

In this way, the transmission element imaging device 100 according to the first embodiment receives a signal (e.g., an RF signal) transmitted from the transmission element P1 such as a beacon by use of the plurality of antennas 21 and calculates the direction of the transmission element P1 based on the signal received by each antenna 21.

Further, the fixing base 32 is driven such that the imaging axis x1 of the camera 31 is oriented in the direction of the transmission element P1. Therefore, the imaging axis x1 of the camera 31 can be oriented in the direction of the transmission element P1, and the camera 31 can capture an image in the direction in which the transmission element P1 is present. For example, if the transmission element P1 is attached to a collar of the pet 51, the camera 31 can capture an image of the pet 51, and the user can view the image of the pet 51 at a remote location. Thus, the user can remotely monitor how the pet 51 left in the house is doing.

In addition, since the marker M1, which indicates the position of the transmission element P1, is added to the captured image D1 including the transmission element P1 and the resultant image is displayed, the user can easily recognize the position of the transmission element P1 in the image. For example, if there is an obstacle between the vehicle V1 and the transmission element P1, the transmission element P1 is behind the obstacle and is not displayed in the image captured by the camera 31. Even in such a case, since the marker M1 is added, the user can recognize the position of the transmission element P1 in the image.

Further, since the vehicle V1 can travel autonomously so as to be located at a desired distance away from the transmission element P1, the camera 31 can capture an image of the transmission element P1 from the suitable distance. Therefore, the camera 31 can capture a good panoramic image of the transmission element P1.

Explanation of Second Embodiment

Next, the second embodiment of the present disclosure is described. In the second embodiment, as in the first embodiment described above, the camera 31 captures an image of the transmission element P1 by directing the imaging axis x1 of the camera 31 toward the direction of the transmission element P1. In addition to this, the distance from the position of the camera 31 to that of the transmission element P1 is calculated. Then, the calculated distance is superimposed on the captured image, and the resultant image is displayed. Since the device configuration is the same as that of FIGS. 1 and 2 described above, the description of the device configuration is omitted.

Figure 7:
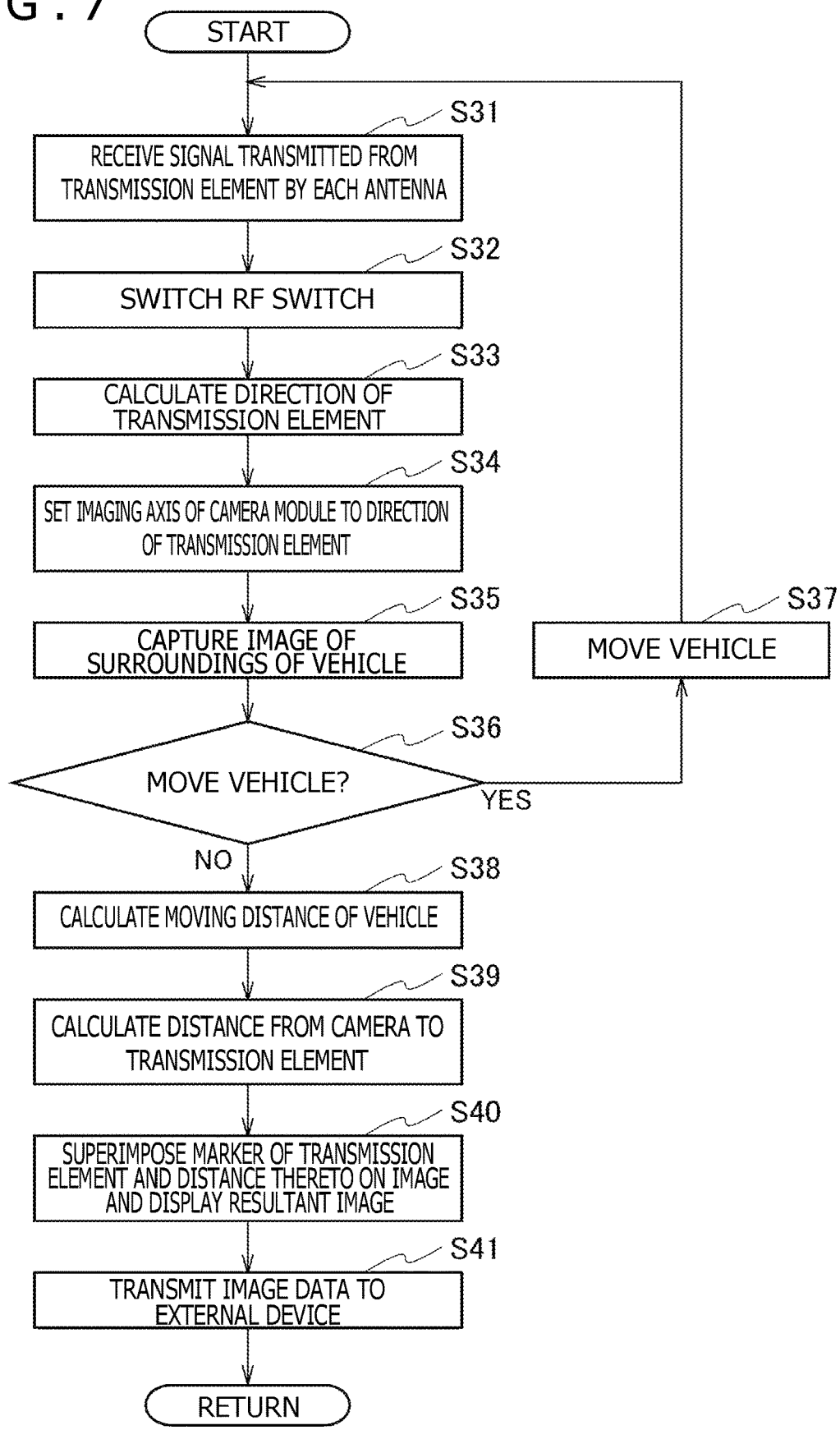
FIG. 7 is a flowchart illustrating the processing procedure of the transmission element imaging device according to a second embodiment of the present disclosure.

Next, an operation of the transmission element imaging device 100 according to the second embodiment will be described with reference to the flowchart illustrated in FIG. 7.

When an RF signal is transmitted from the transmission element P1, each of the antennas 21 mounted in the antenna module 2 receives the RF signal transmitted from the transmission element P1 in step S31.

In step S32, the antenna module 2 switches on and off of the RF switch 22 to sequentially select the output of the RF signal received by each antenna 21 and outputs the selected output to the direction detection unit 11.

In step S33, the direction detection unit 11 calculates the direction of the transmission element P1 based on the phase differences among the received signals received by the individual antennas 21.

In step S34, the drive mechanism 33 of the camera module 3 performs control to drive and rotate the fixing base 32 illustrated in FIG. 3 or 4 around the rotation axis x2 such that the imaging axis x1 of the camera 31 is oriented in the direction of the transmission element P1.

In step S35, the camera 31 captures an image in the direction of the transmission element P1 and outputs the captured image to the image processing unit 13.

In step S36, the vehicle direction setting unit 15 determines whether or not to cause the vehicle V1 to move. As described above, it is necessary to capture an image of the transmission element P1 at multiple positions to calculate the distance from the camera 31 to the transmission element P1. When the vehicle V1 is located at the first position and one image has been captured (S36; YES), the processing proceeds to step S37. Otherwise (S36; NO), the processing proceeds to step S38.

In step S37, the vehicle direction setting unit 15 sets the moving direction of the vehicle V1. The drive unit 4 causes the vehicle V1 to move to the second position. After that, the processing returns to step S31.

In step S38, the moving distance calculation unit 14 calculates the moving direction and the moving distance of the vehicle V1 based on the angular velocity and acceleration detected by the gyro sensor 6.

In step S39, the depth distance calculation unit 18 calculates the distance from the camera 31 to the transmission element P1 based on the images of the transmission element P1 captured at the first and second positions.

In step S40, the image processing unit 13 adds the marker M1 indicating the direction of the transmission element P1 and the distance to the transmission element P1 to the image D2 captured by the camera 31 and displays a resultant image. For example, as illustrated in FIG. 9, when the transmission element P1 is attached to a collar of the pet 51, in this example, a dog kept as a pet, the camera 31 captures the image D2 of the surroundings including the pet 51. The image processing unit 13 generates an image in which the marker M1 and the distance such as "depth xx m" are added to the captured image D2.

In step S41, the communication unit 19 transmits the image generated by the image processing unit 13 to an external device. The image generated by the image processing unit 13 is displayed on the display 5 mounted in the external device such as a smartphone carried by the user, for example. By viewing the image displayed on the display 5, the user can recognize the image including the transmission element P1, that is, the image of the pet 51, at a remote location, for example.

Effects of Second Embodiment

In this way, the transmission element imaging device 100 according to the second embodiment can obtain the same effects as the first embodiment described above.

In addition to these effects, in the second embodiment, the vehicle V1 is caused to move and capture an image of the transmission element P1 at each of two positions (the first position and the second position). Accordingly, the distance from the camera 31 to the transmission element P1 can be calculated. The calculated distance is superimposed on the image of the transmission element P1, and the resultant image is displayed. Thus, for example, even if there is an obstacle between the camera 31 and the transmission element P1 and the transmission element P1 is not displayed in the image, the user can easily recognize the distance from the camera 31 to the transmission element P1.

In the present embodiment, an example in which the transmission element imaging device 100 is mounted in a movable object such as the vehicle V1 and moves has been described. However, when a monocular stereo camera is used as the camera 31 mounted in the camera module 3, the transmission element imaging device 100 may be fixed to a predetermined position without being mounted in a movable object.

Supplement of Embodiments

The embodiments of the present disclosure have been described above. However, the present disclosure is not limited to the embodiments, and those skilled in the art can understand various modifications, corrections, substitutions, replacements, and the like. The classification of the items in the above description is not essential in the present disclosure. The matters described in two or more items may be used in combination if necessary, or the matters described in a certain item may be applied to the matters described in other items (unless inconsistency arises). The boundaries of the functional units or the processing units in the functional block diagrams do not necessarily correspond to the boundaries of physical components. The operations of the plurality of functional units may be performed physically by one component, or the operation of one functional unit may be performed physically by a plurality of components. For the processing procedures described in the embodiments, the order of processes may be switched unless inconsistency arises. In order to facilitate the description of the processes, the transmission element imaging device 100 has been described with reference to the functional block diagrams. However, the device may be implemented by hardware, software, or a combination thereof. Software operated by a processor included in the transmission element imaging device 100 according to the embodiments of the present disclosure may be stored in a random access memory (RAM), a flash memory, a read only memory (ROM), an erasable programmable ROM (EPROM), an electrically erasable and programmable ROM (EEPROM), or a register. Further, software operated by the processor included in the transmission element imaging device 100 according to the embodiments of the present disclosure may be stored in a hard disk drive (HDD), a removable disk, a compact disk ROM (CD-ROM), a database, a server, or other appropriate storage media.

What is claimed is:
1. A transmission element imaging device capturing an image of a transmission element that transmits a signal, the transmission element imaging device comprising:
 a reception element group including a plurality of reception elements each configured to receive the signal transmitted from the transmission element, wherein the plurality of reception elements are on a substrate having a flat plate shape;
 a direction detection circuit configured to detect a direction of the transmission element based on the signal received by each of the plurality of reception elements;
 a camera whose relative positional relation with the reception element group is determined, wherein the camera is configured to capture the image in the direction of the transmission element;
 a fixing base to which the camera is fixed, wherein
  the substrate is fixed to the fixing base such that a normal direction of the substrate matches an imaging axis of the camera,
  the fixing base is rotatable in conjunction with a rotation of the substrate to change an orientation of the substrate, such that the normal direction of the substrate is oriented in the direction of the transmission element, and a relative positional relationship between each reception element of the plurality of reception elements and the camera is fixed; and at least one processor configured to generate an image in which a marker indicating the direction of the transmission element is added to the image captured by the camera.

2. The transmission element imaging device according to claim 1, further comprising a drive mechanism configured to change the orientation of the camera such that an imaging direction of the camera is oriented in the direction of the transmission element.

3. The transmission element imaging device according to claim 2, wherein the drive mechanism is further configured to change the orientation of the camera by driving the fixing base.

4. The transmission element imaging device according to claim 1, wherein the at least one processor is further configured to:

calculate a depth distance from the camera to the transmission element by use of a plurality of images of the transmission element captured at different positions; and generate the image in which the depth distance is superimposed on the image captured by the camera.

5. The transmission element imaging device according to claim 4, wherein the camera and the reception element group are in a movable object capable of traveling, and the at least one processor configured to:

acquire the plurality of images of the transmission element captured at a plurality of positions to which the movable object has been caused to travel; and calculate the depth distance from the camera to the transmission element based on the acquired plurality of images.

6. The transmission element imaging device according to claim 1, wherein the plurality of reception elements are along edges of the substrate, and the camera is on an inner side of the plurality of reception elements.

7. The transmission element imaging device according to claim 6, wherein the normal direction of the substrate matches an imaging direction of the camera, and the substrate is on a side opposite to the imaging direction of the camera.

8. The transmission element imaging device according to claim 1, further comprising an RF switch on a back surface of the substrate, wherein the RF switch is configured to:

sequentially select an output signal from each reception element of the plurality of reception elements; and output the selected output signal to the direction detection circuit.

9. A transmission element imaging method of capturing an image of a transmission element that transmits a signal, the transmission element imaging method comprising:

receiving the signal transmitted from the transmission element by each of a plurality of reception elements, wherein the plurality of reception elements are on a substrate having a flat plate shape;

detecting a direction of the transmission element based on the signal received by each of the plurality of reception elements;

capturing the image in the direction of the transmission element by a camera whose position relative to the plurality of reception elements is determined, wherein the camera is fixed to a fixing base, the substrate is fixed to the fixing base such that a normal direction of the substrate matches an imaging axis of the camera, the fixing base is rotatable in conjunction with a rotation of the substrate to change an orientation of the substrate, such that the normal direction of the substrate is oriented in the direction of the transmission element, and a relative positional relationship between each reception element of the plurality of reception elements and the camera is fixed; and generating and displaying an image in which a marker indicating the direction of the transmission element is added to the captured image.

* * * * *